Oct. 19, 1926.

T. ANDREW 1,603,572

LIQUID ATOMIZING OR SPRAYING APPARATUS

Filed August 28, 1924

Inventor
Tom Andrew
By Marks & Clerk

Patented Oct. 19, 1926.

1,603,572

UNITED STATES PATENT OFFICE.

TOM ANDREW, OF STOCKPORT, ENGLAND.

LIQUID ATOMIZING OR SPRAYING APPARATUS.

Application filed August 28, 1924, Serial No. 734,773, and in Great Britain September 11, 1923.

This invention relates to liquid atomizing or spraying apparatus as used for humidifying and other services and has for its object to provide for the ready and convenient adjustment of the spraying nozzles so as to direct the jet in any desired direction, the apparatus being simple in construction and economical to manufacture.

Referring to the accompanying sheet of explanatory drawings:—

Figure 2:
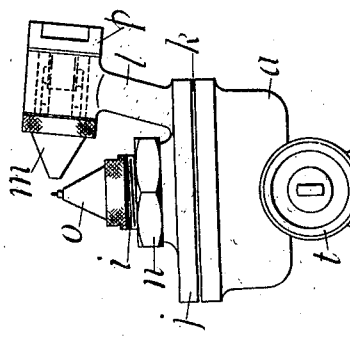
Figure 1:
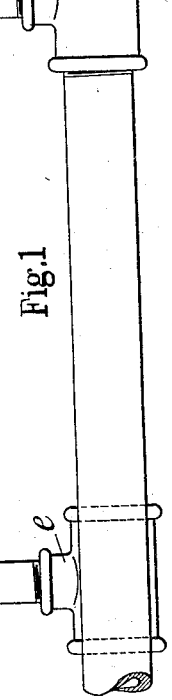
Figure 4:
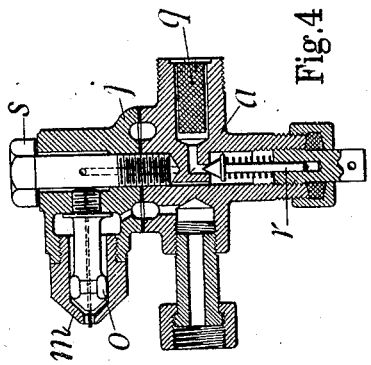
Figure 3:
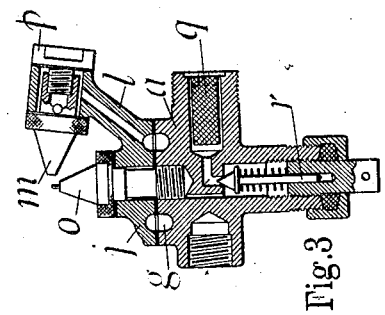

Figure 1 is a sectional side elevation and Figure 2 an end view of an apparatus constructed in accordance with this invention. Figures 3 and 4 are sectional views showing modified forms of the liquid and air nozzles.

The same reference letters in the different views indicate the same or similar parts.

The spraying apparatus as illustrated on Figures 1 and 2, comprises a casing $a$ having hollow trunnion-like extensions $b$ at its opposite sides which are adapted to be connected by suitable coupling fittings $c$ respectively to the liquid supply pipe $d$ and air supply pipe $e$. The casing can be turned about the axis of the trunnions and locked in any desired position by the wing nuts $f$. The interior of the casing $a$ comprises annular and central cavities $g$ and $h$, the annular cavity $g$ receiving the air supply and the central cavity $h$ the liquid supply. The upper end of the casing has two ring-like faces and a projecting externally and internally threaded stem $i$ at the centre around the liquid cavity. A disc $j$ which seats upon packing rings $k$ upon the casing carries an arm-like part $l$ in which the air nozzle $m$ is secured, an aperture through the arm and disc communicating with the annular air cavity $g$. The said disc $j$ can be locked upon the casing by a nut $n$ threaded upon the central stem $i$ before referred to. The liquid nozzle $o$ screws into the end of the said stem. By adjusting the position of the disc $j$ carrying the air nozzle supporting arm $l$, the direction of the spray jet which is produced by the impingement of the air jet upon the liquid jet can be altered to suit requirements. The air nozzle $m$ has an internally threaded portion of reduced diameter which is engaged by the stem of a stud $p$ as seen more clearly at Figure 2, the head of the stud and the nozzle end abutting against the opposite sides of the nozzle-carrying arm. This method of securing the air nozzle in place permits of its ready adjustment with relation to the liquid nozzle.

I may provide a filter $q$, and also a spring-loaded valve $r$ in the central cavity through which the liquid nozzle $o$ is supplied.

Instead of making the air and liquid nozzles external to one another as aforesaid, I may make them concentric, as shown at Figure 4, the cover $j$ of the casing $a$ supporting the said nozzles and communicating with the annular and central cavities. The cover is locked in position by a central stud $s$ having a passage for water therein, and if desired, a filter therearound. The direction in which the spray is delivered can be varied by turning the cover $j$ to any desired position and by turning the casing $a$ about its trunnions. The amount of liquid which is atomized can be regulated by screwing the air nozzle $m$ more or less closely to the liquid nozzle $o$, so varying the quantity of air discharged and the suction action upon the liquid.

The liquid may be fed to the atomizers under a pressure head, or may be lifted thereto by the ejector action of the air jets.

The casing $a$ as shown at Figures 3 and 4 differs somewhat from that shown at Figures 1 and 2, and particularly with respect to the liquid filter $q$ and the valve $r$. With the form and arrangement of such valve as illustrated at Figures 3 and 4 its spring can be readily adjusted from the exterior to suit varying conditions of working.

With the casing $a$ as shown at Figures 3 and 4 either of the forms of cover $j$, with their varying dispositions of nozzles, may be employed as they are interchangeable. At Figure 3 the cover $j$ is secured to the casing by the screw stem of the liquid nozzle $o$, whilst at Figure 4 the cover $j$ is secured by the stud $s$, the threaded portion of which corresponds with the screw stem of the nozzle $o$ of Figure 3.

The liquid and air supply connections $d$ and $e$ are fitted with ordinary control cocks or valves as $t$.

I claim:—

1. A liquid atomizing and spraying apparatus including co-axial liquid supplying means and gas supplying means, a member mounted on said means and capable of revolving about the axis of the means, a cap centrally secured and rotatably adjustable upon said member, a liquid spraying nozzle receiving liquid from the said liquid supplying means, a gas nozzle mounted on said cap, a conduit in the member and cap for feeding gas from the gas supplying means to the gas nozzle, the said liquid and gas nozzles having their outlets disposed to spray fluid at an angle to the plane of rotation of said member, and securing means for the cap permitting the rotation thereof in a plane intersecting the plane of rotation of said member.

2. A liquid atomizer and spraying apparatus including co-axial liquid supplying means and gas supplying means, a member mounted on said means and capable of revolving about the axis of the means, a cap centrally secured and rotatably adjustable upon said member, liquid and gas spraying nozzles mounted on said cap and having their outlets disposed to spray fluid at an angle to the plane of rotation of said member, a conduit in the member and cap for feeding liquid from the liquid supplying means to the liquid nozzle, a second conduit in the member and cap for feeding gas from the gas supplying means to the gas nozzle and securing means for the cap permitting the rotation thereof in a plane intersecting the plane of rotation of said member.

3. A liquid atomizing and spraying apparatus including coaxial liquid supplying means and gas supplying means, a member mounted on said means and capable of revolving about the axis of the means, liquid and gas spraying nozzles mounted on said member and adapted to spray fluid at an angle to the plane of rotation of said member, a conduit in the member for feeding liquid from the liquid supplying means to the liquid nozzle, a second conduit in the member for feeding gas from the gas supplying means to the gas nozzle, and mounting means for the nozzles permitting the rotation of the nozzles in a plane intersecting the plane of rotation of said member, said means comprising a cap rotatably mounted on said member and having its axis of rotation intersecting the axis of the liquid and gas supplying means, the outlet ends of said nozzles being arranged in close proximity to one another.

In testimony whereof I have signed my name to this specification.

TOM ANDREW.